(12) United States Patent
Divakaruni et al.

(10) Patent No.: US 12,491,957 B2
(45) Date of Patent: Dec. 9, 2025

(54) BOND QUALITY ASSESSMENT SYSTEM

(71) Applicant: ZF Active Safety US Inc., Livonia, MI (US)

(72) Inventors: Saikiran Divakaruni, Livonia, MI (US); Priyanka Shaha, Livonia, MI (US); Peter Chew, Livonia, MI (US); Austin Habegger, Livonia, MI (US); Akshayaasri Sridharan, Livonia, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 0 days.

(21) Appl. No.: 18/506,265

(22) Filed: Nov. 10, 2023

(65) Prior Publication Data
US 2025/0153793 A1    May 15, 2025

(51) Int. Cl.
*B62D 65/12* (2006.01)
*B29C 65/82* (2006.01)
*B32B 41/00* (2006.01)
*G01N 21/88* (2006.01)

(52) U.S. Cl.
CPC .......... *B62D 65/12* (2013.01); *B29C 65/8253* (2013.01); *B32B 2041/04* (2013.01); *G01N 2021/8864* (2013.01)

(58) Field of Classification Search
CPC ..................................................... B62D 65/12
USPC ............ 29/407.01, 407.05; 156/64; 228/103, 228/104; 702/35, 36, 81, 82, 83, 84
See application file for complete search history.

(56) References Cited

U.S. PATENT DOCUMENTS

| | | | |
|---|---|---|---|
| 7,132,617 B2 * | 11/2006 | Lee | B23K 11/24 228/103 |
| 12,051,185 B2 * | 7/2024 | Oelscher | G01N 21/8851 |
| 2009/0056868 A1 * | 3/2009 | Basu | B29C 65/4875 156/295 |
| 2016/0328837 A1 | 11/2016 | He et al. | |
| 2018/0114310 A1 | 4/2018 | He et al. | |
| 2022/0082508 A1 * | 3/2022 | Isken | G06N 20/00 |
| 2023/0056387 A1 | 2/2023 | Potozky | |
| 2024/0078654 A1 * | 3/2024 | Miller | F03D 17/00 |

* cited by examiner

*Primary Examiner* — Sarang Afzali
(74) *Attorney, Agent, or Firm* — Tarolli, Sundheim, Covell & Tummino LLP

(57) ABSTRACT

Systems and methods for bond quality assessment are provided. In one example, operations include receiving an input image of a vehicle component have adhesive bonding at a surface of the vehicle component. The operations cause a neural network to generate a set surface of features based on a set of training images. The operations also cause a neural network to classify one or more of the surface features as one or more inadequate coverage regions of the adhesive bonding. The operations further cause the neural network to generate a mapping. The operations cause the neural network to predict a coverage score for the vehicle component based on the one or more inadequate coverage regions. The operations include applying a set of rules to the mapping and the coverage score to generate a bond quality assessment of the vehicle component. The operations include executing a vehicle component fabrication plan.

20 Claims, 5 Drawing Sheets

BOND QUALITY ASSESSMENT SYSTEM

TECHNICAL FIELD

This description relates to a bond quality assessment system for identifying the quality of adhesive bonding on a component.

BACKGROUND

Some vehicle components are bonded to other vehicle components using adhesive bonding. The performance of bonded vehicle components is dependent on the quality of the bond. For example, brake shims are thin metal or rubber adhesive pads that fit between a brake pad and a brake caliper to correct small differences that sometimes lead to noise and vibration. In some assemblies, the brake shims are bonded to a brake pad backing plate of the brake pad with adhesive bonding. If the adhesive bond between the brake shims and the brake pad backing plate is poor, the brake shims do not mitigate noise or vibration, and may even cause greater issues if the adhesive bond fails and the shim is released into the brake assembly.

SUMMARY

A first example relates to a non-transitory machine-readable medium having machine executable instructions for a bond quality assessment system that causes a processor core to execute operations. The operations include receiving an input image of a vehicle component have adhesive bonding at a surface of the vehicle component. The operations cause a neural network to generate a set surface of features of the surface of the vehicle component based on a set of training images. The operations also cause a neural network to classify one or more of the surface features of the set of surface features as inadequate coverage regions of the adhesive bonding on the surface of the vehicle component. The operations further cause the neural network to generate a mapping of the one or more mapped inadequate coverage regions. The operations yet further cause the neural network to predict a coverage score for the vehicle component based on the one or more inadequate coverage regions. The operations include applying a set of rules to the mapping and the coverage score to generate a bond quality assessment of the vehicle component. The operations also include executing a vehicle component fabrication plan in response to the bond quality assessment.

A second example relates to a bond quality assessment system that includes a memory for storing machine-readable instructions and a processor core. The processor core accesses the machine-readable instructions and executes the machine-readable instructions as operations. The operations include receiving an input image of a vehicle component have adhesive bonding at a surface of the vehicle component. The operations cause a neural network to generate a set of surface features of the surface of the vehicle component based on a set of training images. The operations also cause a neural network to classify one or more of the surface features of the set of surface features as inadequate coverage regions of the adhesive bonding on the surface of the vehicle component. The operations further cause the neural network to generate a mapping of the one or more mapped inadequate coverage regions. The operations yet further cause the neural network to predict a coverage score for the vehicle component based on the one or more inadequate coverage regions. The operations include applying a set of rules to the mapping and the coverage score to generate a bond quality assessment of the vehicle component. The operations also include executing a vehicle component fabrication plan in response to the bond quality assessment.

A third example relates to a method for assessing bond quality. The method includes receiving an input image of a vehicle component have adhesive bonding at a surface of the vehicle component. The method includes generating a set surface of features of the surface of the vehicle component based on a set of training images. The method also includes classifying one or more of the surface features of the set of surface features as inadequate coverage regions of the adhesive bonding on the surface of the vehicle component. The method further includes generating a mapping of the one or more mapped inadequate coverage regions. The method yet further includes calculating a coverage score for the vehicle component based on the one or more inadequate coverage regions. The method includes applying a set of rules to the mapping and the coverage score to generate a bond quality assessment of the vehicle component. The method also includes executing a vehicle component fabrication plan in response to the bond quality assessment . . .

DETAILED DESCRIPTION

Figure 1:
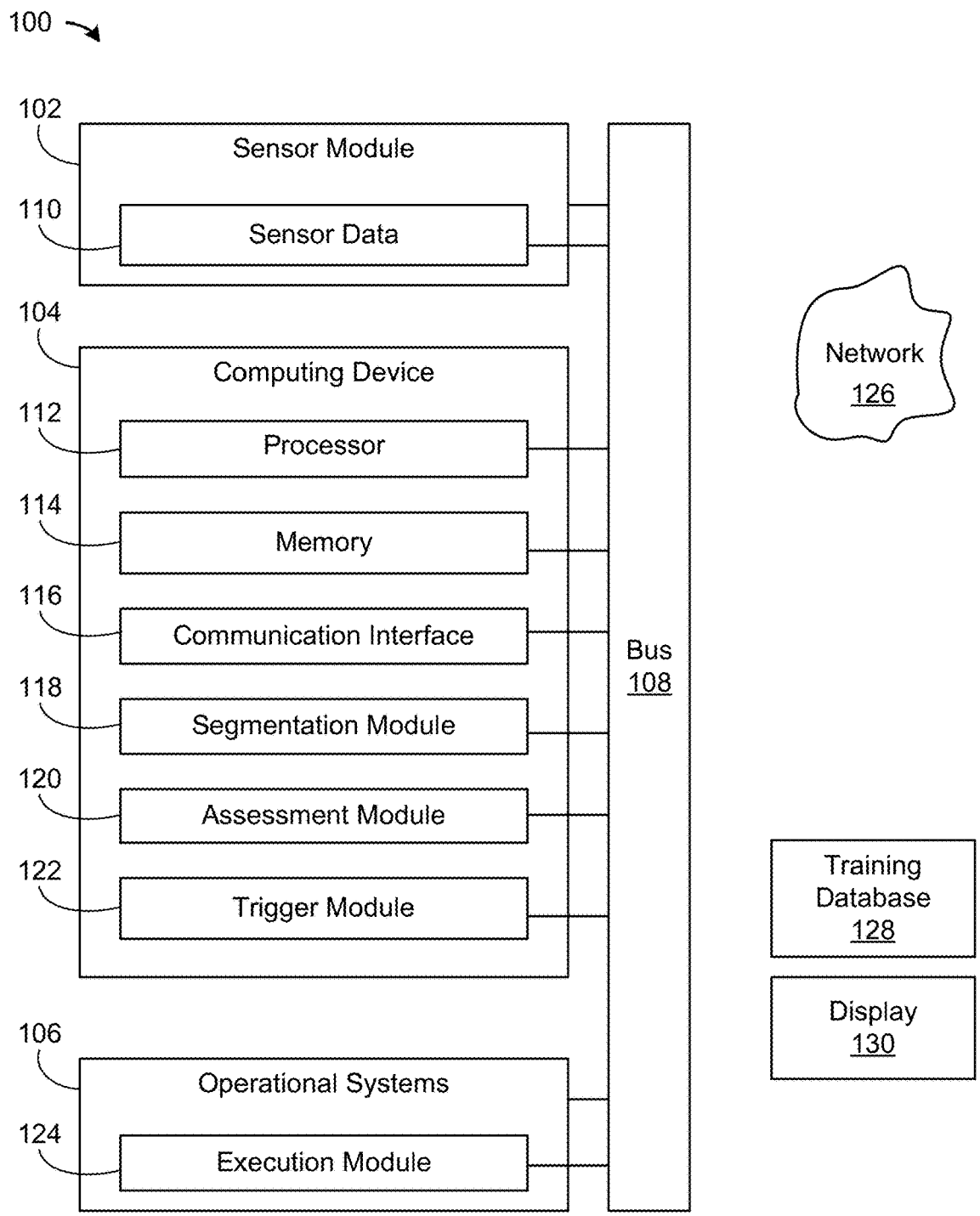
FIG. 1 illustrates an example of an operating environment for a bond quality assessment system.

The performance of bonded vehicle components is dependent on the quality of the coverage of the adhesive bonding. For example, the brake shims are bonded to a brake pad backing plate of a brake pad. Applied on the brake pad backing plate, the adhesive bonding provides a barrier between the brake pad and the caliper, helping to prevent vibrations. Typically, the coverage of the adhesive bonding on the brake shim is manually checked by a human operator to identify whether a predefined area of the vehicle component has good or bad bonding. As one example, a grid template, having a set of predefined shapes, is applied to the shim surface, and the human operator counts the number of shapes that have bad bond coverage to determine if there is adequate adhesive bonding on the vehicle component.

This manual process is subjective and time consuming. For example, one operator may determine that an area corresponding to a predefined shape of the grid template has good bonding if at least fifty percent of the area in the predefined shape has adhesive bonding. However, another operator may identify the area of the predefined shape as having poor bonding if any portion of the area lacks bond coverage. Accordingly, it is time consuming for operators to make quality determinations for each predetermined shape, and different operators may evaluate the areas corresponding to the predefined shapes differently.

The systems and methods described herein automate the process, and consequently improve efficiency and productivity. For example, a neural network is trained with training images of vehicle components to generate a set of surface features of the surface of a vehicle component being tested. The surface features do not correspond to predefined shapes. Instead, the surface features are based on the vehicle component being assessed. For example, the surface features may be identified using image segmentation techniques. One or more of the surface features are identified as inadequate coverage regions of the adhesive bonding on the surface of the vehicle component. The neural network predicts a coverage score for the vehicle component based on the one or more inadequate coverage regions, thereby reducing the subjectivity and delay introduced in the quality assessment when various human operators manually assess bond quality using a template.

Additionally, the systems and methods provided herein can be tailored to the vehicle component. For example, a mapping may be generated to show the relative distances between the one or more inadequate coverage regions. A set of rules is applied to the mapping and the coverage score to generate a bond quality assessment of the vehicle component. The rules may compare the coverage score to the minimum coverage value. As another example, the rules may impose localization values to determine if the inadequate coverage regions are associated with particular defects of the vehicle component. Also, the rules may be defined to determine if the inadequate coverage regions are localized to a single area on the surface of the vehicle component which may indicate a manufacturing defect or process failure so that the quality of the vehicle components and the efficiency of the manufacturing process can be improved.

FIG. 1 illustrates an example operating environment of a bond quality assessment system 100. The components of the bond quality assessment system 100, as well as the components of other systems, hardware architectures, and software architectures discussed herein, can be combined, omitted, or organized into different architectures for various embodiments. For example, the bond quality assessment system 100 may represent an application software executing on a computing platform of the operating environment. The bond quality assessment system 100 includes a sensor module 102, a computing device 104, and an operational system 106 interconnected by a bus 108.

The sensor module 102 receives sensor data 110 associated with a component having adhesive bonding. For clarity, a component will be described with respect to vehicular examples, as a vehicle component of a vehicle. The vehicle is a moving machine that traverses a physical environment and is powered by any form of energy. The vehicle may be a spacecraft, aircraft, watercraft, submarine, car, truck, van, minivan, sport utility vehicle, motorcycle, scooter, amusement ride car, or rail transport. The vehicle may include vehicles that are automated or non-automated with predetermined paths or be free moving.

Figure 2:
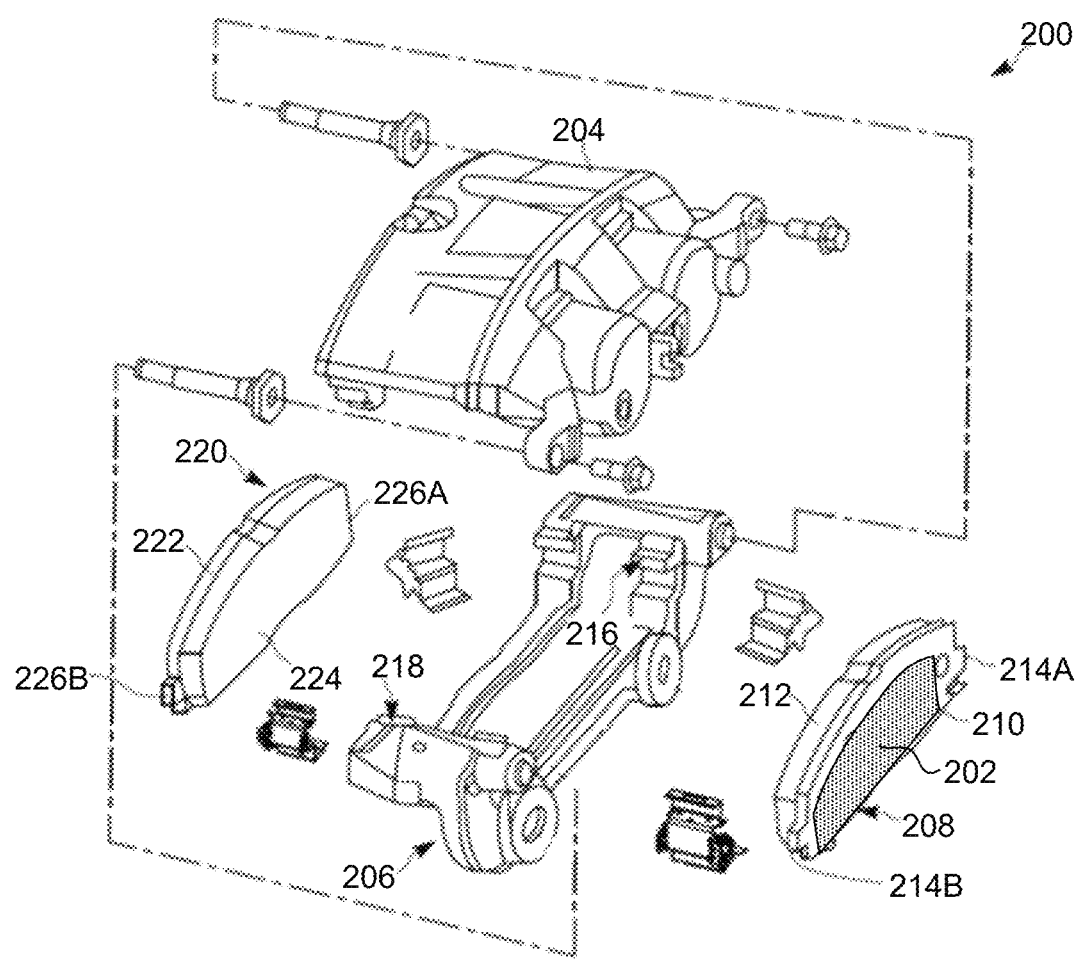
FIG. 2 illustrates an example of a physical environment of a vehicle component assessed with the bond quality assessment system.

Turning to FIG. 2, in one example, the physical environment is a disc brake assembly 200 and the vehicle component is an inboard brake shim 202 that helps absorb vibration and mitigates noise. The disc brake assembly 200 includes a generally C-shaped caliper 204, an anchor bracket 206, and an inboard brake pad 208, respectively. The disc brake assembly 200 is illustrated as being adapted for use on a front left wheel of a vehicle but could likewise be implemented on a front right, rear right, and/or rear left wheel.

The inboard brake pad 208 includes the inboard brake shim 202, a backing plate 210, and a friction pad 212. The inboard brake shim 202 is bonded to the backing plate 210 with adhesive bonding (not shown). The inboard brake shim 202 includes opposite ends having outwardly projecting first and second inboard guide rails 214A, 214B formed thereon. The first and second inboard guide rails 214A, 214B are configured to support the inboard brake pad 208 for sliding movement within the first and second channels 216 and 218, respectively, of the anchor bracket 206.

In another embodiment, the vehicle component is an outboard brake shim (not shown) of an outboard brake pad 220. The outboard brake pad 220 includes the outboard brake shim, an outboard backing plate 222, and an outboard friction pad 224. The outboard brake shim is bonded to the outboard backing plate 222 with adhesive bonding (not shown). The outboard backing plate 222 includes opposite ends having outwardly projecting first and second outboard guide rails 226A, 226B formed thereon. The first and second outboard guide rails 226A, 226B are configured to support the outboard brake pad 220 for sliding movement within the first and second channels 216 and 218, respectively, of the anchor bracket 206. Therefore, the vehicle component is a component of the vehicle that is bonded to another component.

Returning to FIG. 1, the sensor module 102 may receive the sensor data 110 from an image capture device (not shown). For example, the sensor data 110 may include light data regarding the shape and surface of the vehicle component. Accordingly, the sensors and/or the sensor module 102 are operable to sense a measurement of data associated with the vehicle component and generate a data signal for the measurement of data. These data signals can be converted into other data formats (e.g., numerical) and/or used by the sensor module 102, the computing device 104, and/or the operational system 106 to generate sensor data 110 including data metrics and parameters. The sensors can be any type of sensor, for example, acoustic, electric, optical, imaging, light, and thermal, among others. Furthermore, a single sensor may be described that includes multiple sensors and/or sensing components.

The computing device 104 includes a processor core 112, a memory 114, and a communication interface 116, which are each operably connected for computer communication via a bus 108 and/or other wired and wireless technologies. The processor core 112 processes signals and performs general computing and arithmetic functions. Signals processed by the processor may include digital signals, data signals, computer instructions, processor instructions, messages, a bit, a bit stream, that may be received, transmitted and/or detected. Generally, the processor core 112 may be a variety of various processors including multiple single and multicore processors and co-processors and other processor architectures. The processor core 112 may include logic circuitry to execute actions and/or algorithms.

The processor core 112 may also include any number of modules for performing instructions, tasks, or executables. A module includes, but is not limited to, non-transitory computer readable medium that stores instructions, instructions in execution on a machine, hardware, firmware, software in execution on a machine, and/or combinations of each to perform a function(s) or an operation(s), and/or to cause a function or operation from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

The memory 114 may include volatile memory and/or nonvolatile memory. The memory may store an operating system that controls or allocates resources of the computing device 104. The memory 114 represents a non-transitory machine-readable memory (or other medium), such as RAM, a solid state drive, a hard disk drive or a combination thereof. The memory 114 may also be a remote data store, for example, cloud storage.

The communication interface 116 provides software and hardware to facilitate data input and output between the components of the computing device 104 and other components, networks, and data sources. The communication interface 116 may include input and/or output devices for receiving input and/or devices for outputting data. Input devices may include, for example, keyboard, microphones, pointing and selection devices, cameras, imaging devices, video cards, displays, push buttons, rotary knobs, and the like. Input devices may also include graphical input controls that take place within a user interface which may be displayed by various types of mechanisms such as software and hardware-based controls, interfaces, touch screens, touch pads or plug and play devices. An output device includes, for example, display devices, and other devices for outputting information and functions, such as a display 130. In a cloud architecture, the communication interface 116 may be an application programming interface (API). The API may generally be a set of defined methods of communication between various software components.

The computing device 104 includes a segmentation module 118, an assessment module 120, and a trigger module 122. The memory 114 may store machine-readable instructions and/or operations associated with the modules 118-122. The memory 114 may store machine-readable instructions and/or operations associated with the execution module 124 of the operation system 106. For example, the segmentation module 118 may cause a neural network to generate a set surface of features of the surface of the vehicle component, identify one or more inadequate coverage regions from the set of surface features, and predict a coverage score for the vehicle component. The segmentation module 118 may additionally cause the neural network to generate a mapping of the one or more mapped inadequate coverage regions. The assessment module 120 applies a set of rules to the mapping and the coverage score to generate a bond quality assessment of the vehicle component. The trigger module 122 executes a vehicle component fabrication plan in response to the bond quality assessment. The processor core 112 accesses the memory 114 and executes the machine-readable instructions as operations.

The computing device 104 is also operably connected for computer communication (e.g., via the bus 108 and/or the communication interface 116) to one or more operational systems 106. The operational system 106 can include, but is not limited to, any systems that can be used to assess, track, and/or fabricate the vehicle component. The execution module 124 monitors, analyzes, fabricates, and/or operates the vehicle component, to some degree. For example, the execution module 124 may store, predict, and provide a bond quality assessment and facilitates features like batch tracking batches of vehicle components at different manufacturing and quality control stages. In some embodiments, the execution module 124 may be a Proportional, Integral, Derivative (PID) controller. The implementation of the operational system 106 is dependent on the application of the bond quality assessment system 100.

In one embodiment, the memory 114 may include a neural network that may be configured to execute computer/machine based/deep learning techniques to further execute one or more algorithms to make bond quality assessments. The neural network may be configured as a shallow neural network, a convolutional neural network (CNN), a Recurrent Neural Network (RNN) that includes a plurality of fully connected layers, or another type of neural network. In one embodiment, the neural network may utilize the computing device 104 to process instructions and/or operations that enable computer/machine based/deep learning that may be centered on one or more forms of input data, such an input image, that is provided to the neural network. The bond quality assessment system 100 may communicate with the neural network to send and receive data with respect to the modules 118-124.

In another embodiment, a module of the modules 118-124 may be an artificial neural network that acts as a framework for machine learning, including deep learning. For example, a module may be a CNN or a conditional generative adversarial network (cGAN). A module of the modules 118-124 may include an encoder, decoder, symbol predictor, etc. For example, the segmentation module 118 may include an autoencoder, a long short-term memory (LSTM), or other artificial RNN that determines the features to classify the surface features of the vehicle component in a supervised or an unsupervised manner.

The sensor module 102, the computing device 104, and/or the operational systems 106 are also operatively connected for computer communication to a network 126. For example, the network 126 provides software and hardware to facilitate data input and output between the computing device 104 and data sources such as a training database 128, a display 130, etc. The network 126 is, for example, a data network, the Internet, a wide area network (WAN) or a local area (LAN) network. The network 126 serves as a communication medium to various remote devices (e.g., databases, web servers, remote servers, application servers, intermediary servers, client machines, other portable devices).

Figure 3:
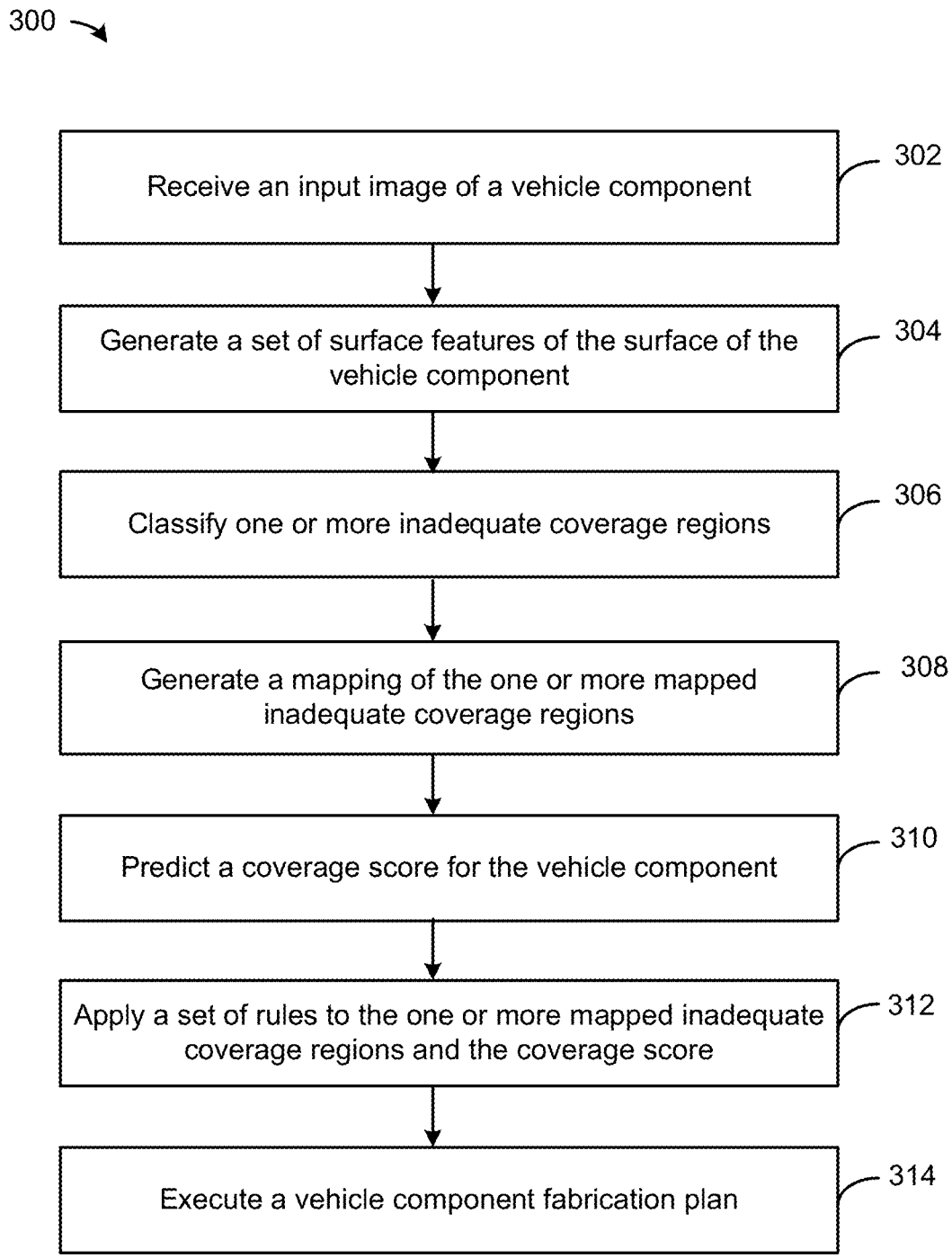
FIG. 3 illustrates a flowchart of an example method for a bond quality assessment with a bond quality assessment system.
Figure 4:
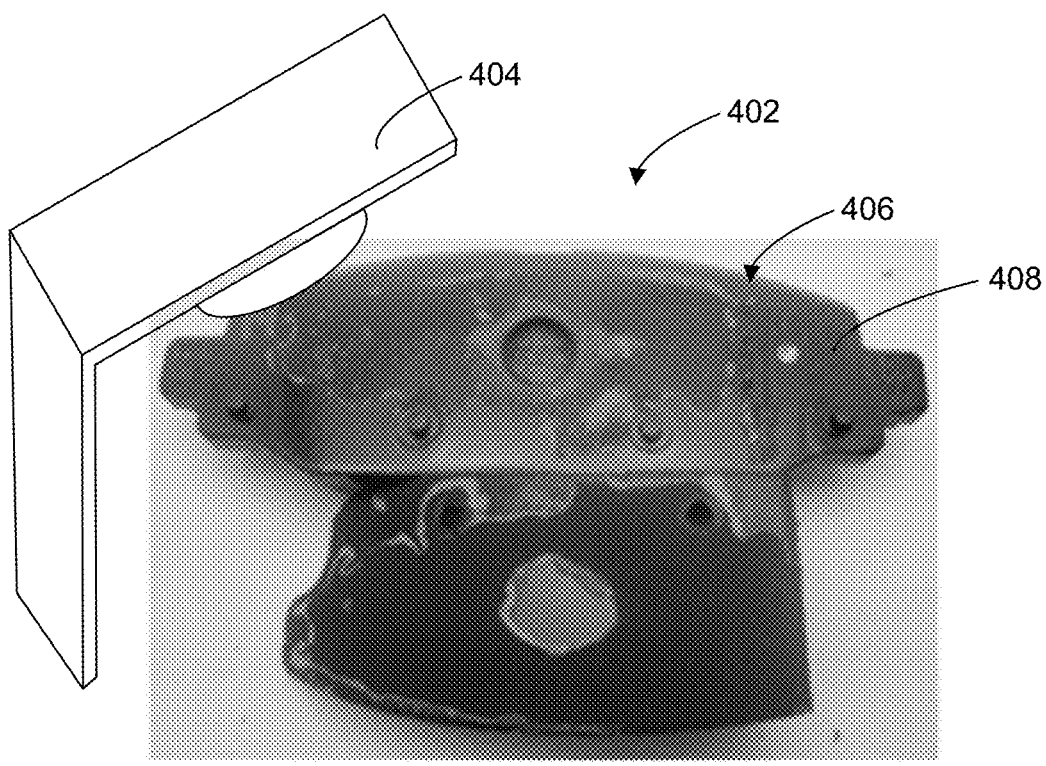
FIG. 4 illustrates an example input image of a vehicle component for a bond quality assessment system.

FIG. 3 illustrates a flowchart of an example method for a bond quality assessment with a bond quality assessment system. FIG. 3 will also be described with reference to FIGS. 1, 2, and 4-7. For simplicity, the method 300 will be described as a sequence of blocks, but it is understood that the elements of the method 300 can be organized into different architectures, elements, stages, and/or processes. For purposes of simplification, FIGS. 4-7 employ the same reference numbers to denote the same structure.

At block 302, the method 300 includes the sensor module 102 receiving sensor data 110. The sensor data 110 may include an image, a video sequence or a series of images, user inputs, and/or data. In one embodiment, the sensor data 110 includes an input image 402 received from an image sensor 404, shown in FIG. 4.

The input image 402 shows adhesive bonding 406 on a surface of a vehicle component 408. The adhesive bonding 406 is applied to the surface of the vehicle component 408 during fabrication according to a fabrication plan. For example, the adhesive bonding 406 may be applied on the surface of the vehicle component 408 in a deposition process of the fabrication plan. As another example, the adhesive bonding 406 may be applied to the surface of the vehicle component 408 in a roll coating process of the fabrication plan. The adhesive bonding may include urethane adhesive, polyurethane adhesive, epoxy adhesive, and acrylic adhesive, among others. The adhesive bonding 406 may have uniform or varying thickness or cross-sectional area. The adhesive bonding 406 may extend to an edge of the surface of the vehicle component 408.

In addition to the input image 402, the sensor data 110 may also include intrinsic parameters associated with the image sensor 404. The image sensor 404 may include radar units, lidar units, image capture components, sensors, cameras, scanners (e.g., 2-D scanners or 3-D scanners), or other measurement components. In some embodiments, the sensor data 110 is augmented with additional sensor data from other sources. For example, the sensor data 110 from the image sensor 404 may be augmented with a LiDAR sensor (not shown) and/or remote devices via the bus 108 and/or the communication interface 116.

Figure 5:
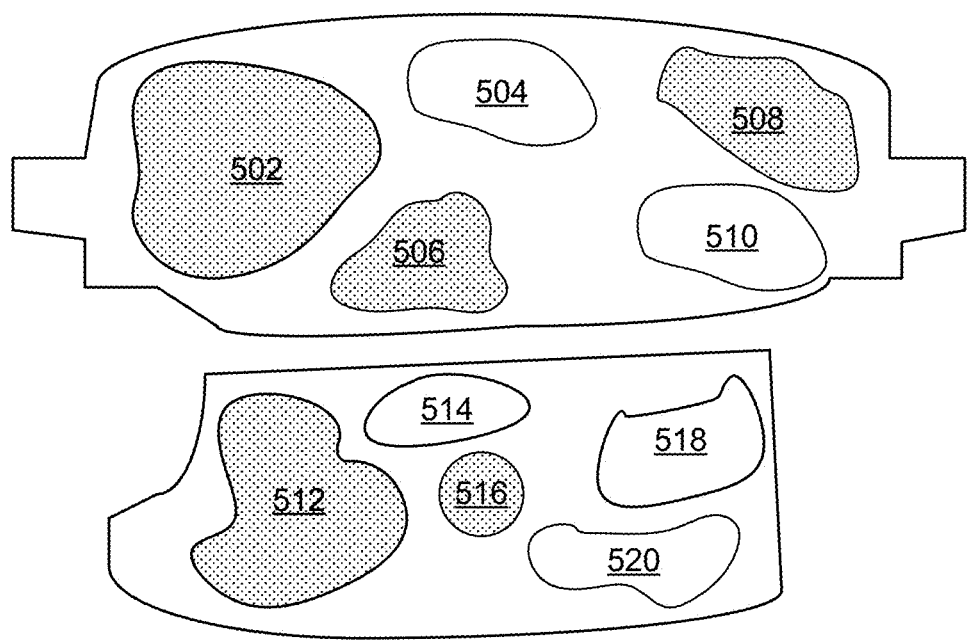
FIG. 5 illustrates an example of segmentation of surface features with one or more inadequate coverage regions of adhesive bonding.
Figure 6:
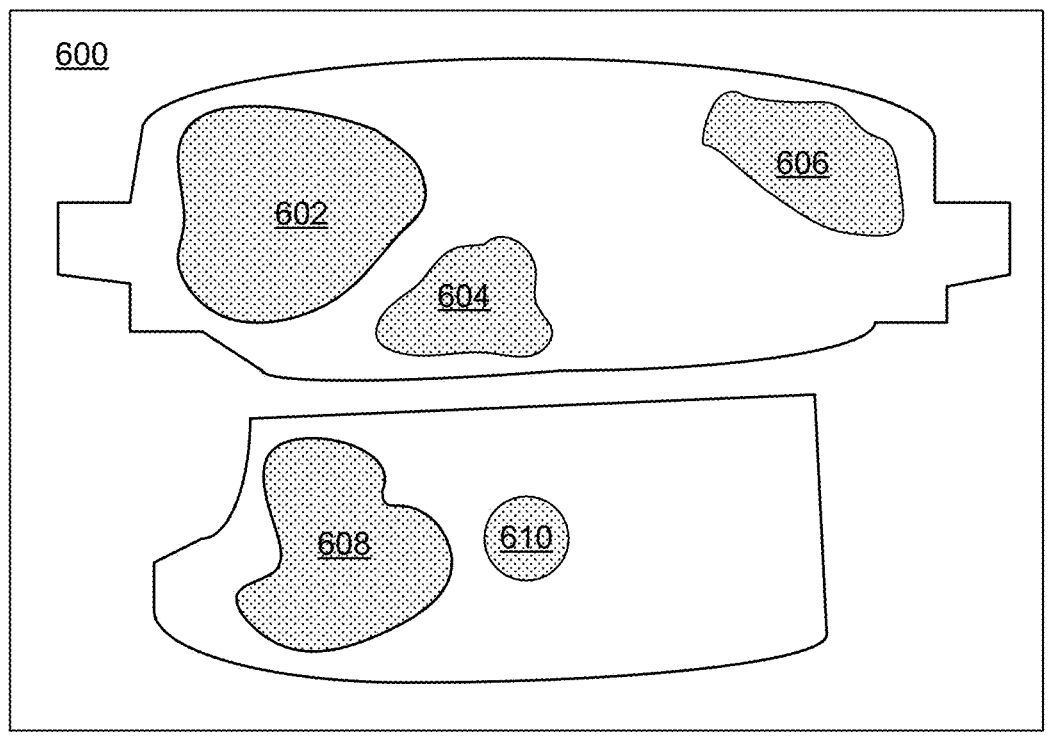
FIG. 6 illustrates an example network architecture of a bond quality assessment system.

At block 304, the method 300 includes the segmentation module 118 generating a set of surface features of the surface of the vehicle component 408 based on a set of training images. The surface of the vehicle component 408 defines a total area. For example, a set of surface features may include information about a first surface feature 502, a second surface feature 504, a third surface feature 506, a fourth surface feature 508, a fifth surface feature 510, a sixth surface feature 512, a seventh surface feature 514, and an eighth surface feature 516, a ninth surface feature 518, and a tenth surface feature 520, as shown in FIG. 5. A surface feature defines a feature area of the surface of the vehicle component 408 that is less than the total area. The surface features 502-520 may not be contiguous. For example, the combined feature areas of the features 502-520 may not equal the total area of the surface of the vehicle component 408.

The shape of a surface feature is defined by a feature perimeter. The feature perimeters may be identified based on differences in the coverage of the adhesive bonding 406. The surface feature areas of the surface features 502-520 are not based on a predetermined mapping of shapes, such as a grid or circle matrix, but instead are based on the coverage of the adhesive bonding 406 on the vehicle component 408 as imaged in the input image 402. Therefore, the surface feature areas may vary. Likewise, the feature perimeters are not repeated standard geometric shapes, such as circles, squares, rectangles, triangles, or chevrons. Instead, the feature perimeters may define amorphous shapes based on differences in the coverage of the adhesive bonding 406 on the surface of the vehicle component.

The segmentation module 118 may utilize a neural network to identify the surface features based on semantic segmentation. The neural network may include a stack of residual blocks followed by a convolutional layer. As one example, the neural network is a convolutional neural network. As another example, the neural network is a recurrent neural network (RNN) which may include a long short term memory (LSTM). The extracted features may be up-sampled using bilinear interpolation to match a ground truth to determine any loss. The ground truth may be established by a set of training images. In some embodiments, the surface features 502-520 may be multi-scale features that are extracted using different layers of the neural network.

In another embodiment, the segmentation module 118 may generate the surface features 502-520 in a depth map that includes depth values for pixels of a plurality of pixels of the input image 402. The depth values include information relating to the distance between the surface of the vehicle component 408 and the adhesive bonding 406. The depth values may be used to calculate the thickness of the adhesive bonding 406 on the vehicle component 408. The depth values may form a depth dataset. The depth values may be estimated by the neural network. The depth map includes per-pixel data containing depth-related information.

At block 306, the method 300 includes the segmentation module 118 classifying one or more of the surface features 502-520 of the set of surface features as inadequate coverage regions of the adhesive bonding on the surface of the vehicle component. For example, the segmentation module 118 may identify the a first surface feature 502, the third surface feature 506, the fourth surface feature 508, the sixth surface feature 512, and the eighth surface feature 516 as a first inadequate coverage region 602, the second inadequate coverage region 604, the third inadequate coverage region 606, the fourth inadequate coverage region 608, and the fifth inadequate coverage region 610, respectively, as shown in the mapping 600 of FIG. 6. The one or more inadequate coverage regions 602-610 indicate areas of the surface of the vehicle component 408 where the adhesive bonding 406 is absent from the surface of the vehicle component 408. The inadequate coverage areas 602-610 may also indicate areas of the surface of the vehicle component 408 that have less amount and/or thickness of the adhesive bonding 406.

Figure 7:
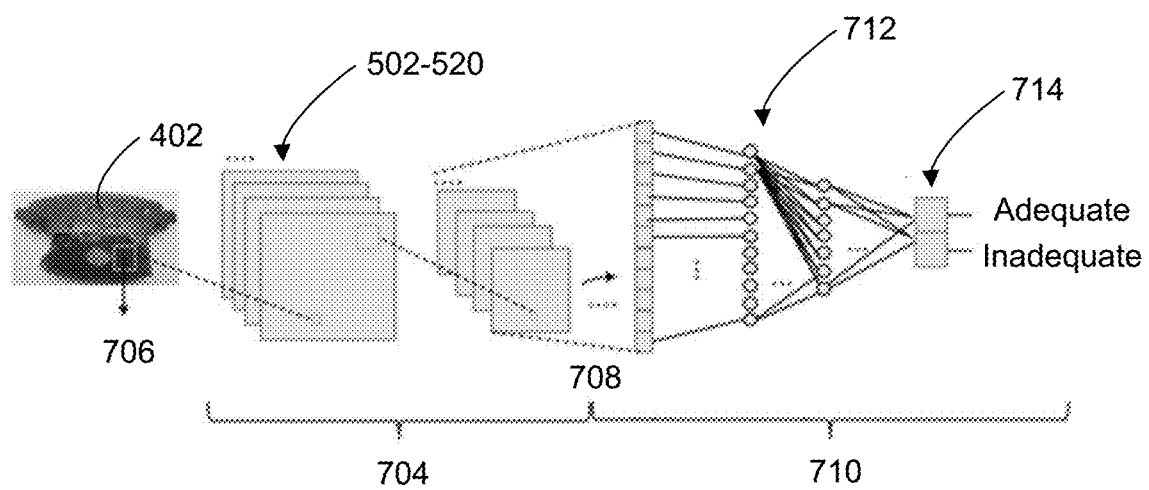
FIG. 7 illustrates an example mapping of one or more inadequate coverage regions of adhesive bonding.

Classifying one or more inadequate coverage regions 602-610 may include the segmentation module 118 assigning a surface feature 502-520 of the set of surface features 502-520 a label of inadequate. Turning to FIG. 7, the neural network may be trained based on ground truth data that includes or is based on a set of training images of vehicle components. The set of training images may be stored in the memory 114. In another embodiment, the set of training images may be stored in a training database. For example, if the vehicle component 408 is a brake shim, then the set of training images may be images of brake shims that were previously tested for adhesive bonding coverage. The set of training images may show tested vehicle components at prior stages of fabrication, such as tested brake shims. Additionally or alternatively, the set of training images may show other vehicle components with similar features, functions, or type as the vehicle component 408.

In one embodiment, the training images of the set of training images are annotated with labels that indicate whether the tested vehicle component has inadequate adhesive bonding coverage or adequate adhesive bonding coverage. In some embodiments, the labels indicate regions of inadequate adhesive bonding on the surface of the test brake shim. The training images may also be annotated with classes that are populated by attributes associated with the adhesive bonding 406 and/or the vehicle component 408. In another embodiment, the neural network may utilize a regression approach for unsupervised learning.

In one example, the neural network may use gradient weighted class activation mapping (GRAD-CAM) technique. The GRAD-CAM technique uses the sensor data 110 flowing into a neural network architecture's final convolutional layer/feature map to identify the surface features 502-520 that have the greatest influence on a given output class. The surface features 502-520 where this gradient is strongest has an impact on the final prediction class. The input to the regression model includes the set of training images categorized as having either adequate or inadequate coverage, along with the corresponding actual coverage scores. The neural network architecture may be a sequential model with the layers Conv 2D, Maxpooling 2D, Flatten and Dense. The Sequential class allows you to create a linear stack of layers in the neural network.

The surface features 502-520, such as the first surface feature 502, are identified in the input image 402 based on the set of training images. In one embodiment, the first surface feature 502 are extracted from the input image 402 in an extraction stage 704. For example, the input image 402 is filtered with a convolution layer including kernels, such as the kernel 706, learned from the training images. The first surface feature 502 is detected with an activation function, such as a rectified linear unit (ReLu). Conv2D layers perform convolutions on the input image, with ReLu activation introducing non-linearity. MaxPooling 2D layers down sample the feature maps by retaining the maximum values in each pooling window.

The extracted features of the extraction stage 704, such as the first surface feature 502, are converted to a feature vector during a flattening stage 708. The Flatten layer converts the multidimensional feature maps into a one-dimensional vector. In this example, the feature vector is used in a classification stage 710. The classification stage 710 delineates whether the surface features 502-520, such as the first surface feature 502 is adequate or inadequate. For example, a fully connected layer 712 may include perceptrons that may be configured to analyze numeric data parameters (e.g., thickness, area, relative position, etc.) associated with the training images through machine learning/deep learning techniques and output processed data associated with the numeric data parameters. The fully connected layers are Dense layers with ReLu activation for the first three, enabling the model to learn complex representations. For example, the last Dense layer has a custom activation function that maps the output to the desired target range by considering the minimum (0) and maximum value (100) of the actual score from input. Therefore, the output 714 classifies a surface feature of the surface features 502-520 as adequate or inadequate. Surface features that are classified as inadequate are assigned to the one or more inadequate coverage regions, here including inadequate coverage regions 602-610. By applying suitable algorithms, the neural network generates a clear visual representation, distinguishing the regions of good bond coverage from those with poor bond coverage. This segmentation allows for a more intuitive understanding of the bond quality.

Returning to FIG. 3, at block 308, the method 300 includes generating the mapping 600 of the one or more mapped inadequate coverage regions. The mapping may be an annotated image, such as the mapping 600 shown in FIG. 6. In another embodiment, the mapping 600 may be a dataset. The mapping 600 includes relative distances between the one or more inadequate coverage regions 602-610. The mapping includes information also includes the sizes of the one or more inadequate coverage regions 602-610. For example, the mapping 600 includes the surface area of the one or more inadequate coverage regions 602-610. The mapping 600 may also include the percentage area of the one or more inadequate coverage regions 602-610. The percentage area is the ratio of the surface area of the inadequate coverage region, such as the first inadequate coverage region 602, and the total area. For example, the percentage area of the first inadequate coverage region 602 is 8% of the total area.

At block 310 of FIG. 3, the method 300 includes the assessment module 120 calculating a coverage score for the vehicle component 408 based on the one or more inadequate coverage regions 602-610. The coverage score is indicative of the amount of the bonding adhesive bonding 406 on the vehicle component 408. For example, the amount of the adhesive bonding 406 of the vehicle component 408 may be determined based on the data parameters (e.g., size, number, surface area, thickness, etc.) of the one or more inadequate coverage regions 602-610. As another example, coverage score is the amount of the adhesive bonding 406 based on the amount of surface area of the vehicle component 408 that has the adhesive bonding 406. The coverage score may be the complement percentage of the ratio of the combined surface area of each of the inadequate coverage regions 602-610 to the total area of the vehicle component 408. For example, if the ratio of the combined surface area of each of the inadequate coverage regions 602-610 to the total area of the vehicle component 408 is 15%, then the coverage score is the complement percentage, 85%.

In yet a further example, the coverage score may be predicted using a statistical model, such as a regression model based on the set of training images. The regression model predicts the coverage score based on the training images, allowing for a quantitative assessment of the bond coverage. In a regression problem, the objective is to predict a numerical value as the output. The input to the regression model includes the annotated training images categorized as having either good or bad coverage, along with the corresponding actual coverage scores. The regression model aims to predict the coverage score based on the annotated training images, allowing for a quantitative assessment of the bond coverage of the vehicle component 408.

In some embodiments, the assessment module 120 may utilize a neural network, such as the neural network utilized by the segmentation module 118, to predict a coverage score for the vehicle component 408. For example, in addition to classifying one or more of the surface features 502-520 as inadequate coverage regions, the fully connected layer 712 may classify the vehicle component 408 during the classification stage 710 with a coverage score based on the one or more inadequate coverage regions 602-610.

At block 312, the method 300 includes the trigger module 122 applying a set of rules to one or more of the coverage score and the mapping 600 to generate a bond quality assessment for the vehicle component 408. The bond quality assessment includes a set of results that characterize the quality of the adhesive bonding 406 on the surface of the vehicle component 408. A result of the set of results is a defect result if the quality of the adhesive bonding 406 is unsatisfactory. A result of the set of results is a nominal result if the quality of the adhesive bonding 406 is satisfactory.

The set of rules may be stored in the memory 114. The rules of the set of rules adapt the coverage score and/or the mapping 600 to the vehicle component 408, the application of the vehicle component, and/or the fabrication of the vehicle component 408. For example, a minimum amount of adhesive bonding 406 may be necessary for adherence of the vehicle component to another component. Accordingly, a first rule of the set of rules may include a minimum coverage value for the coverage score. To apply the first rule, the trigger module 122 determines whether the minimum coverage value is satisfied. For example, the trigger module 122 compares the minimum coverage value to the coverage score. If the coverage score does not satisfy the minimum coverage value, the first result is a defect result. If the coverage score does satisfy the minimum coverage value, the first result is a nominal result.

In another embodiment, the minimum coverage value is a percentage amount of the adhesive bonding 406. For example, the minimum coverage value is 90% and the ratio of combined surface area of each of the inadequate coverage regions 602-610 to the total area is 15% such that the coverage score is 85%. The coverage score, 85%, does not satisfy the minimum coverage value of 90% so the first result is a defect result in response to the coverage score not exceeding the minimum coverage value.

A second rule of the set of rules may include a localization value for the mapping 600. The bond quality assessment includes a set of results. The second result of the bond quality assessment is a defect result in response to the largest percentage area of an inadequate coverage region, such as the first inadequate coverage region 602, exceeding the localization value. For example, the segmentation module 118 calculates one or more percentage areas of the one or more inadequate coverage regions 602-610 of the mapping 600. Suppose the first inadequate coverage region 602 is the largest of the one or more inadequate coverage regions and the percentage area of the first inadequate coverage region 602 is 8% of the total area. If the localization value is 10%, the second result of applying the second rule is a nominal result because the percentage area of the first inadequate coverage region 602 does not exceed the localization value of 10%. Accordingly, the bond quality assessment of the vehicle component 408 includes a defect result in response to the largest percentage area exceeding the localization value.

The trigger module 122 may apply the rules in parallel or sequence. In response to the rules of the set of rules being applied in parallel, the set of results of the bond quality assessment may include results from each rule applied, such as the first result and the second result. For example, the bond quality assessment may include a first result, a defect result, and a second result, a nominal result. Alternatively, if the rules are applied in sequence, the trigger module 122 may apply the second rule based on the first result of the first rule. For example, if the first result is a defect result, the trigger module 122 may not apply the second rule.

In some embodiments, generating the bond quality assessment includes displaying a bond quality assessment dashboard on a display 130, as shown in FIG. 1. The bond quality assessment dashboard may include the input image 402, numeric data parameters, the mapping 600, the set of rules, and/or the set of results. In one example, the vehicle component 408 fails in response to at least one result of the set of results being classified as a defect result and the defect result is displayed on bond quality assessment dashboard.

Returning to FIG. 3, at block 314, the method 300 includes the execution module 124 executing a vehicle component fabrication plan in response to the bond quality assessment. The vehicle component fabrication plan includes processes and/or devices for assessing, tracking, and/or fabricating the vehicle component 408. For example, the bond quality assessment system 100 may be utilized to determine if a batch of vehicle components, including the vehicle component 408, is defective. If set of results in the bond quality assessment includes a defect result, executing the vehicle component fabrication plan includes causing the bond quality assessment system 100 to assess an additional vehicle component from the batch.

A failure attribute may be associated with a defect result. For example, the fabrication plan may include spray coating the surface of the vehicle component 408 with the adhesive bonding 406 with an array of spray devices. If the set of results includes a defect result based on a localization value, then the failure attribute may indicate a specific spray device of the array of spray devices is associated with the inadequate coverage region with the largest percentage area exceeding the localization value. In some embodiments, executing the vehicle component fabrication plan addresses the failure attribute. Continuing the example from above, executing the vehicle component fabrication plan may include increasing flow to the specific spray device of the array of spray devices to provide additional adhesive bonding 406 at the surface of the vehicle component 408 at the inadequate coverage region having the largest percentage area.

In one embodiment, executing a vehicle component fabrication plan may include adjusting a bonding parameter on the bond quality assessment dashboard in response to receiving a user input. For example, a user may define the flow rate of a flow to the specific spray device. The bonding parameters are adjustable and may be changed in response to the bond quality assessment.

The display 130 is configured to display a set of results and a number of bonding parameters. Adjustments may be received by a display interface (e.g., the communication interface 116 of FIG. 1). The display interface may include provisions for receiving input and/or communicating information as output to the display 130. The display interface and/or the display 130 can include one or more input buttons, switches, touch screen, touch pad, pointer, lights, microphones, speakers, and LEDs, among others. Therefore, executing the vehicle component fabrication plan can address the defect results of the bond quality assessment. The rules of the set rules are defined to identify manufacturing defects or process failures so that the quality of the vehicle component 408 and the efficiency of the manufacturing process can be addressed in the vehicle component fabrication plan.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

A "value" as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value of X may be given as a percentage between 0% and 100%. In other cases, the value of X could be a value in the range between 1 and 10. In still other cases, the value of X may not be a numerical value, but could be associated with a given discrete state, such as "not X", "slightly x", "x", "very x" and "extremely x".

In this description, unless otherwise stated, "about," "approximately" or "substantially" preceding a parameter means being within +/−10 percent of that parameter. Modifications are possible in the described embodiments, and other embodiments are possible, within the scope of the claims.

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A non-transitory machine-readable medium having machine executable instructions for a bond quality assessment system causing a processor core to execute operations, the operations comprising:
   receiving an input image of a vehicle component having adhesive bonding at a surface of the vehicle component;
   causing a neural network to:
      generate a set of surface features having one or more surface features on the surface of the vehicle component based on a set of training images;
      classify one or more of the surface features of the set of surface features as one or more inadequate coverage regions of the adhesive bonding on the surface of the vehicle component;
      generate a mapping of the one or more inadequate coverage regions; and
      predict a coverage score for the vehicle component based on the one or more inadequate coverage regions; and
   applying a set of rules to the mapping and the coverage score to generate a bond quality assessment of the vehicle component;
   executing a vehicle component fabrication plan in response to the bond quality assessment; and
   increasing flow to a specific spray device to provide additional adhesive bonding at the surface of the vehicle component to at least one of the one or more inadequate coverage regions.

2. The non-transitory machine-readable medium of claim 1, wherein the vehicle component is a brake shim and the set of training images are images of tested brake shims.

3. The non-transitory machine-readable medium of claim 1, wherein the coverage score is predicted using a regression model based on the set of training images.

4. The non-transitory machine-readable medium of claim 1, wherein the bond quality assessment includes a set of results, wherein a result of the set of results is classified as a defect result or a nominal result, and wherein the vehicle component fails in response to at least one result of the set of results being classified as a defect result.

5. The non-transitory machine-readable medium of claim 4, wherein the operations further comprise identifying a failure attribute associated with the defect result, wherein the vehicle component fabrication plan addresses the failure attribute.

6. The non-transitory machine-readable medium of claim 1, wherein the set of rules defines a localization value for the mapping and a minimum coverage value for the coverage score.

7. The non-transitory machine-readable medium of claim 6, wherein applying the set of rules includes comparing the coverage score to the minimum coverage value and the bond quality assessment of the vehicle component includes a defect result in response to the coverage score not exceeding the minimum coverage value.

8. The non-transitory machine-readable medium of claim 6, wherein the operations further comprise:
   calculate one or more percentage areas of the one or more inadequate coverage regions of the mapping; and
   identify a largest percentage area of the one or more percentage areas, wherein applying the set of rules includes comparing the largest percentage area to the localization value.

9. The non-transitory machine-readable medium of claim 8, wherein the bond quality assessment of the vehicle component includes a defect result in response to the largest percentage area exceeding the localization value.

10. A bond quality assessment system comprising:
    a memory for storing machine-readable instructions; and
    a processor core for accessing the machine-readable instructions and executing the machine-readable instructions as operations, the operations comprising:
       receiving an input image of a vehicle component having adhesive bonding at a surface of the vehicle component;
       causing a neural network to:
          generate a set of surface features having one or more surface features on the surface of the vehicle component based on a set of training images;
          classify one or more of the surface features of the set of surface features as one or more inadequate coverage regions of the adhesive bonding on the surface of the vehicle component;
          generate a mapping of the one or more inadequate coverage regions; and
          predict a coverage score for the vehicle component based on the one or more inadequate coverage regions; and
       applying a set of rules to the one or more inadequate coverage regions and the coverage score to generate a bond quality assessment of the vehicle component;
       executing a vehicle component fabrication plan in response to the bond quality assessment; and
       increasing flow to a specific spray device to provide additional adhesive bonding at the surface of the vehicle component to at least one of the one or more inadequate coverage regions.

11. The bond quality assessment system of claim 10, wherein the vehicle component is a brake shim and the set of training images are images of tested brake shims.

12. The bond quality assessment system of claim 10, wherein the bond quality assessment includes a set of results, wherein a result of the set of results is classified as a defect result or a nominal result, and wherein the vehicle component fails in response to at least one result of the set of results being classified as a defect result.

13. The bond quality assessment system of claim 12, wherein the operations further comprise identifying a failure attribute associated with the defect result, wherein the vehicle component fabrication plan addresses the failure attribute.

14. The bond quality assessment system of claim 10, wherein the set of rules defines a localization value for the mapping and a minimum coverage value for the coverage score.

15. The bond quality assessment system of claim 14, wherein applying the set of rules includes comparing the coverage score to the minimum coverage value and the bond quality assessment of the vehicle component includes a defect result in response to the coverage score not exceeding the minimum coverage value.

16. The bond quality assessment of claim 10, further comprising:
a display configured to display a bond quality assessment dashboard including a set of results and a number of bonding parameters, wherein the operations comprise:
adjusting a bonding parameter on the bond quality assessment dashboard of the display in response to user input.

17. A method for bond quality assessment, the method comprising:
receiving, at a segmentation module of a computing device, an input image of a vehicle component having adhesive bonding at a surface of the vehicle component;
generating, by the segmentation module of the computing device, a set of surface features having one or more surface features on the surface of the vehicle component based on a set of training images;
classifying, by the segmentation module of the computing device, one or more of the surface features of the set of surface features as one or more inadequate coverage regions of the adhesive bonding on the surface of the vehicle component;
generating, by the segmentation module of the computing device, a mapping of the one or more inadequate coverage regions; and
predicting, by an assessment module of the computing device, a coverage score for the vehicle component based on the one or more inadequate coverage regions; and
applying, by a trigger module of the computing device, a set of rules to the mapping and the coverage score to generate a bond quality assessment of the vehicle component;
executing a vehicle component fabrication plan, of an execution module of operational system, in response to the bond quality assessment; and
increasing flow to a specific spray device to provide additional adhesive bonding at the surface of the vehicle component to at least one of the one or more inadequate coverage regions.

18. The method of claim 17, wherein the bond quality assessment includes a set of results, wherein a result of the set of results is classified as a defect result or a nominal result, wherein the vehicle component fails in response to at least one result of the set of results being classified as the defect result.

19. The method of claim 18, wherein the method further comprises:
identifying, by the execution module, a failure attribute associated with the defect result, wherein the vehicle component fabrication plan addresses the failure attribute.

20. The method of claim 19, wherein the set of rules defines a localization value for the mapping and a minimum coverage value for the coverage score, and the method further comprises:
comparing, by the assessment module, the coverage score to the minimum coverage value and the bond quality assessment of the vehicle component includes a defect result in response to the coverage score not exceeding the minimum coverage value.

* * * * *